United States Patent
Kodera

(10) Patent No.: US 9,650,067 B2
(45) Date of Patent: May 16, 2017

(54) STEERING CONTROL APPARATUS

(71) Applicant: JTEKT CORPORATION, Osaka-shi, Osaka (JP)

(72) Inventor: Takashi Kodera, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/972,634

(22) Filed: Dec. 17, 2015

(65) Prior Publication Data

US 2016/0185384 A1    Jun. 30, 2016

(30) Foreign Application Priority Data

Dec. 24, 2014 (JP) .................. 2014-260915

(51) Int. Cl.
*B62D 5/04* (2006.01)
(52) U.S. Cl.
CPC .................. *B62D 5/0469* (2013.01)
(58) Field of Classification Search
CPC .................................................. B62D 5/0469
See application file for complete search history.

(56) References Cited

FOREIGN PATENT DOCUMENTS

| DE | 197 13 576 A1 | 10/1998 |
|---|---|---|
| EP | 1 708 355 A1 | 10/2006 |
| JP | 5050421 B2 | 10/2012 |

OTHER PUBLICATIONS

Jun. 3, 2016 Extended Search Report issued in European Patent Application No. 15201378.5.

*Primary Examiner* — Aaron L Troost
(74) *Attorney, Agent, or Firm* — Oliff PLC

(57) ABSTRACT

A steering control apparatus is provided which enables, when the absolute value of a tire angle increases, suppression of a force that is applied to a steering system and that acts to increase the absolute value of the tire angle. A dq transformation circuit uses a control angle to transform currents flowing through a motor into currents id and iq on a d axis and a q axis. Current feedback control circuits calculate command voltages as manipulative values that are used to feed the currents id and iq back to command currents id* and iq*, respectively. A uvw transformation circuit transforms the command voltages into three-phase command voltages. An angle manipulation processing circuit fixes the control angle when a rotation angle is updated if the absolute value of the tire angle is equal to or larger than a prescribed value.

15 Claims, 9 Drawing Sheets

STEERING CONTROL APPARATUS

INCORPORATION BY REFERENCE

The disclosure of Japanese Patent Application No. 2014-260915 filed on Dec. 24, 2014 including the specification, drawings and abstract, is incorporated herein by reference in its entirety.

BACKGROUND OF THE INVENTION

1. Field of the Invention

The invention relates to a steering control apparatus that manipulates an electric power conversion circuit connected to a synchronous motor in order to generate a steering assist force using a torque of the synchronous motor.

2. Description of Related Art

In an electric power steering system (steering control apparatus), a steering operation of increasing a tire angle (a steered angle that is the angle of steered wheels) to a given value or larger is inhibited. Specifically, for example, in a rack and pinion system, an end of a rack shaft comes into contact with a rack housing to inhibit a steering operation of further increasing the tire angle (see Paragraph [0006] in Japanese Patent No. 5050421).

However, when the end of the rack shaft comes into contact with the rack housing, the electric power steering system (steering control apparatus) may be subjected to impact. The impact is desirably mitigated.

SUMMARY OF THE INVENTION

It is an object of the present invention to provide a steering control apparatus that, when an absolute value of a tire angle increases, suppresses such a force that is applied to a steering system and increases an absolute value of a tire angle.

According to an aspect of the present invention, a steering control apparatus includes:

an assist processing circuit that manipulates an electric power conversion circuit connected to a synchronous motor in order to generate a steering assist force using a torque of the synchronous motor;

a tire-angle acquisition processing circuit that acquires one of a tire angle of a vehicle and an equivalent value of the tire angle;

a rotation-angle acquisition processing circuit that acquires a rotation angle of the synchronous motor;

a transformation processing circuit that executes a coordinate transformation on an intermediate variable obtained during calculation of a manipulation signal output to the electric power conversion circuit by the assist processing circuit, according to a control angle determined based on the rotation angle of the synchronous motor; and an angle manipulation processing circuit that sets a change rate of the control angle same as a change rate of the rotation angle acquired by the rotation-angle acquisition processing circuit when one of an absolute value of the tire angle and an absolute value of the equivalent value thereof is smaller than a prescribed value, and that changes the change rate of the control angle from the change rate of the rotation angle acquired by the rotation-angle acquisition processing circuit when the one of the absolute value of the tire angle and the absolute value of the equivalent value thereof is equal to or larger than the prescribed value.

In this configuration, the assist processing circuit outputs the manipulation signal to the electric power conversion circuit, and the electric power conversion circuit is manipulated by the manipulation signal to control the torque of the synchronous motor. The coordinate transformation is executed by the transformation processing circuit on the intermediate variable obtained during the calculation of the manipulation signal. The change rate of the rotation speed used by the transformation processing circuit is changed from the change rate of the rotation speed acquired by the rotation-angle acquisition processing circuit when the one of the absolute values acquired by the tire-angle acquisition processing circuit is equal to or higher than the prescribed value. In this case, the manipulation signal does not correspond to rotation of the synchronous motor, and thus, the phases of currents flowing through the synchronous motor are changed unlike in a case where the change rate remains the same. Thus, the torque of the synchronous motor changes. Consequently, when the absolute value of the tire angle increases, a force can be suppressed which is applied to a steering system and which acts to increase the absolute value of the tire angle.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
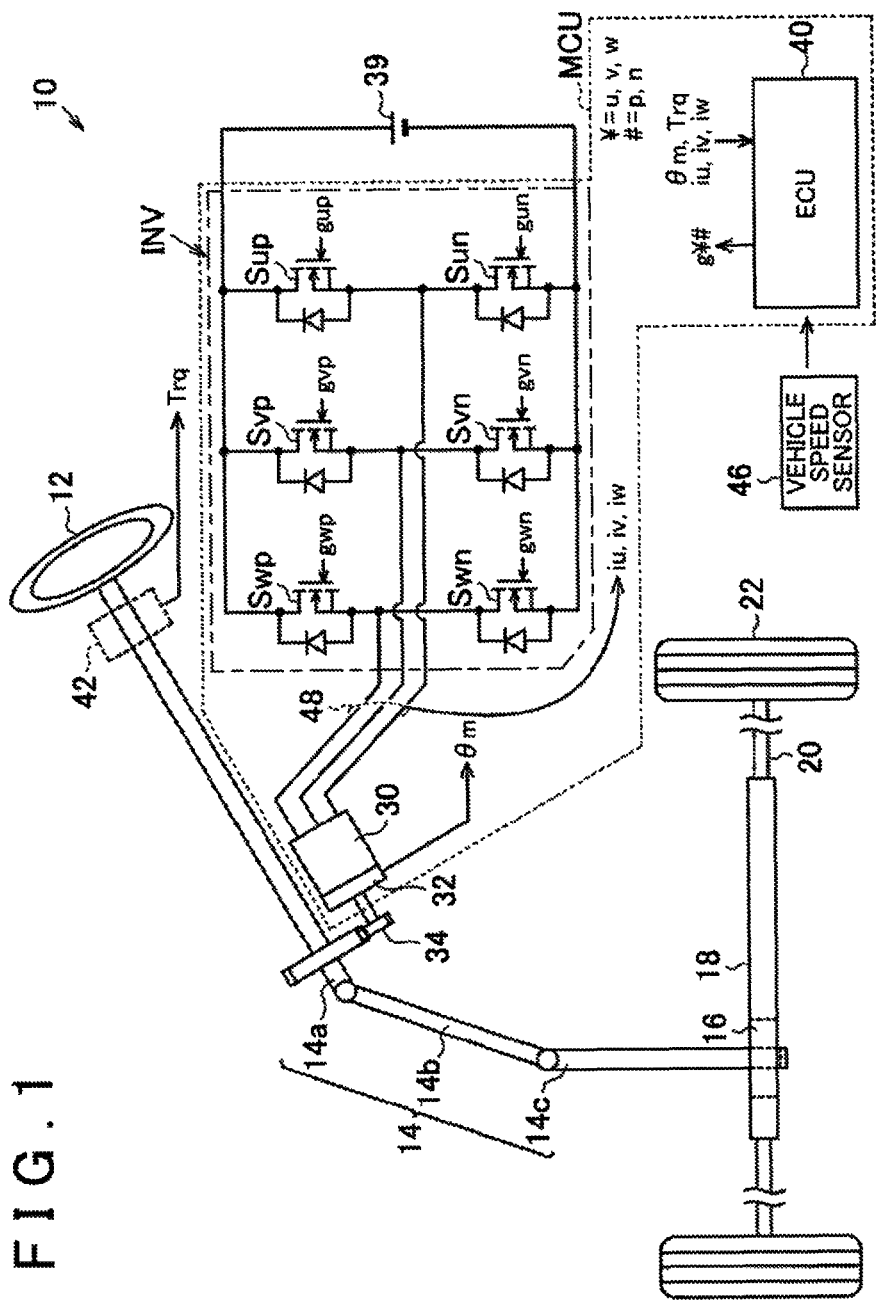
FIG. 1 is a system configuration diagram of a steering control apparatus according to a first embodiment.

A first embodiment of the present invention will be described below with reference to the drawings. An electric power steering system (EPS 10) depicted in FIG. 1 includes a steering control apparatus in a first embodiment. In the EPS 10, a steering shaft 14 to which a steering wheel 12 is fixed is coupled to a rack shaft 18 via a rack and pinion mechanism 16. Rotation of the steering shaft 14 due to a steering operation is converted into a reciprocating linear motion of the rack shaft 18 by the rack and pinion mechanism 16. The steering shaft 14 in the present embodiment includes a column shaft 14a and an intermediate shaft 14b, and the steering shaft 14 is coupled to a pinion shaft 14c. The reciprocating linear motion of the rack shaft 18 due to the rotation of the steering shaft 14 is transmitted to a knuckle not depicted in the drawings, via tie rods 20 coupled to both ends of the rack shaft 18, and thus a tire angle of steered wheels 22 is changed.

The EPS 10 includes a motor 30 that apples an assist force used to assist the steering operation to a steering system, and a control apparatus (ECU 40) that controls the motor 30. The motor 30 is coupled to the column shaft 14a via a speed reducer 34. The rotation speed of the motor 30 is reduced and the resultant rotation is transmitted to the column shaft 14a, so that the assist force corresponding to the torque of the motor 30 is applied to the steering system. In the present embodiment, the motor 30 is assumed to be a surface permanent magnet synchronous motor (SPMSM). The motor 30 includes a resolver 32 that detects a rotation angle θm of a rotating shaft of the motor 30.

The motor 30 is connected to a battery 39 via an inverter INV. The inverter INV is a circuit that allows for electrical connection and disconnection between each of a positive electrode and a negative electrode of the battery 39 and three terminals of the motor 30.

In FIG. 1, MOS field effect transistors (switching elements) included in the inverter INV and connected to the respective terminals of the motor 30 are denoted by reference characters u, v, and w. An upper arm is denoted by reference character p and a lower arm is denoted by reference character n. Reference characters u, v, and w are hereinafter collectively represented as ¥, and reference characters p and n are hereinafter collectively represented as #. That is, the inverter INV includes a series-connection member including a switching element S¥p that allows for electrical connection and disconnection between the positive electrode of the battery 39 and the terminals of the motor 30 and a switching element S¥n that allows for electrical connection and disconnection between the negative electrode of the battery 39 and the terminals of the motor 30.

In the present embodiment, the motor 30, the inverter INV, and the ECU 40 are packaged into a single motor unit MCU. The ECU 40 receives the rotation angle Om detected by the resolver 32, a steering torque Trq detected by a torque sensor 42, a vehicle speed V detected by a vehicle speed sensor 46, currents iu, iv, and iw from the motor 30 detected by a current sensor 48. Based on these detected values, the ECU 40 outputs a manipulation signal g¥# to the inverter INV connected to the motor 30 so as to manipulate the inverter INV and thus control the torque of the motor 30. That is, the ECU 40 is a manipulation circuit for the inverter INV. In the present embodiment, the rotation angle θm is an electrical angle.

Figure 2:
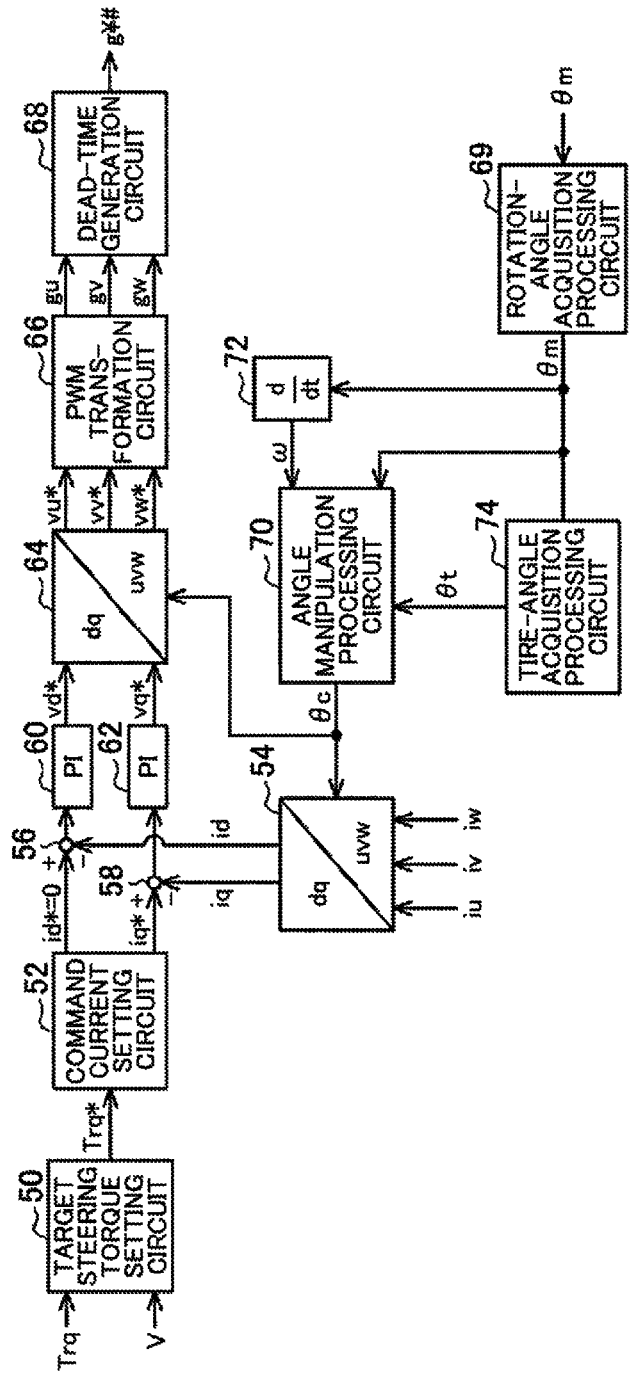
FIG. 2 is a block diagram relating to assist control according to the first embodiment.

FIG. 2 depicts a block diagram of the ECU 40. Each control circuit depicted in FIG. 2 is implemented by a microcomputer provided in the ECU 40 by executing a control program. A target steering torque setting circuit 50 sets a target steering torque Trq* that is a command value for the torque of the motor 30 based on the steering torque Trq and the vehicle speed V. A command current setting circuit 52 sets command currents id* and iq* on a d axis and a q axis based on the target steering torque Trq*. The command current setting circuit 52 sets the command current iq* on the q axis such that the absolute value of the command current iq* increases as the absolute value of the target steering torque Trq* increases. On the other hand, the command current setting circuit 52 sets the command current id* on the d axis to zero.

A dq transformation circuit 54 transforms three-phase currents iu, iv, and iw detected by the current sensor 48 into currents id and iq on the d and q axes. A deviation calculation circuit 56 outputs a value resulting from subtraction of the current id from the command current id* on the d axis. A deviation calculation circuit 58 outputs a value resulting from subtraction of the current iq from the command current iq* on the q axis. A current feedback control circuit 60 calculates a command current vd* on the d axis as a manipulative value that is used to feed the current id on the d axis back to command current id*. On the other hand, a current feedback control circuit 62 calculates a command current vq* on the q axis as a manipulative value that is used to feed the current iq on the q axis back to command current iq*. In the present embodiment, each of the current feedback control circuits 60 and 62 is configured using a proportional element and an integral element. An output from each of the current feedback control circuits 60 and 62 is the sum of an output value from the proportional element and an output value from the integral element that are obtained using, as an input, an output value from a corresponding one of the deviation calculation circuits 56 and 58.

A uvw transformation circuit 64 transforms the command voltages vd* and vq* on the d and q axes into three-phase command voltages vu*, vv*, and vw*. A PWM transformation circuit 66 generates three-phase PWM signals gu, gv, and gw based on the three-phase command voltages vu*, vv*, and vw*. A PWM signal g¥ defines an on operation period for the switching element S¥p of the upper arm using a logical H period except for a dead time. A dead-time generation circuit 68 generates the manipulation signal g¥# for the switching element S¥# based on the PWM signal g¥, and outputs the manipulation signal g¥# to the inverter INV. A dead time is applied to the manipulation signal g¥# such that, before a first switching element of the switching element S¥p of the upper arm and the switching element S¥n on the lower arm that has been turned off is turned on, a second switching element is turned off.

On the other hand, a rotation-angle acquisition processing circuit 69 acquires the rotation angle θm of the motor detected by the resolver 32. This process may involve, for example, sampling an output signal from the resolver 32. An angle manipulation processing circuit 70 normally outputs the rotation angle θm acquired by the rotation-angle acquisition processing circuit 69 to the dq transformation circuit 54 and the uvw transformation circuit 64 as a rotation angle used for a coordinate transformation by the dq transformation circuit 54 and the uvw transformation circuit 64 (this rotation angle is hereinafter referred to as a control angle θc). The angle manipulation processing circuit 70 executes processing of changing a change rate of the control angle θc with respect to a change rate of the rotation angle θm based on output values from a tire-angle acquisition processing circuit 74 and a speed calculation circuit 72. This processing will be described below.

The speed calculation circuit 72 calculates an electrical angular speed (rotation speed ω) based on the rotation angle θm of the motor. On the other hand, the tire-angle acquisition processing circuit 74 acquires a tire angle θt of the steered wheels 22. In the present embodiment, the tire-angle acquisition processing circuit 74 independently calculates the tire angle θt based on the rotation angle θm. This can be achieved by executing an integral processing on the rotation angle θm. That is, the rotation angle θm is a parameter with a value ranging from 0° to 360°, but the absolute value of the tire angle θt gradually increases while the motor 30 is making a plurality of rotations, and thus there is no one-to-one correspondence between the rotation angle θm of the motor and the tire angle θt. Thus, the tire-angle acquisition processing circuit 74 integrates the rotation angle θm to calculate the tire angle θt. The maximum value of the absolute value of the tire angle θt is smaller than 360°. Since the steering control apparatus is provided with the speed reducer 34, the motor 30 makes a plurality of rotations before the absolute value of the tire angle θt is maximized. To set the tire angle θt to the actual value of the tire angle, the tire-angle acquisition processing circuit 74 multiplies the integral value of the rotation angle θm by, for example, a coefficient corresponding to a speed reduction ratio of the speed reducer 34.

Figure 3:
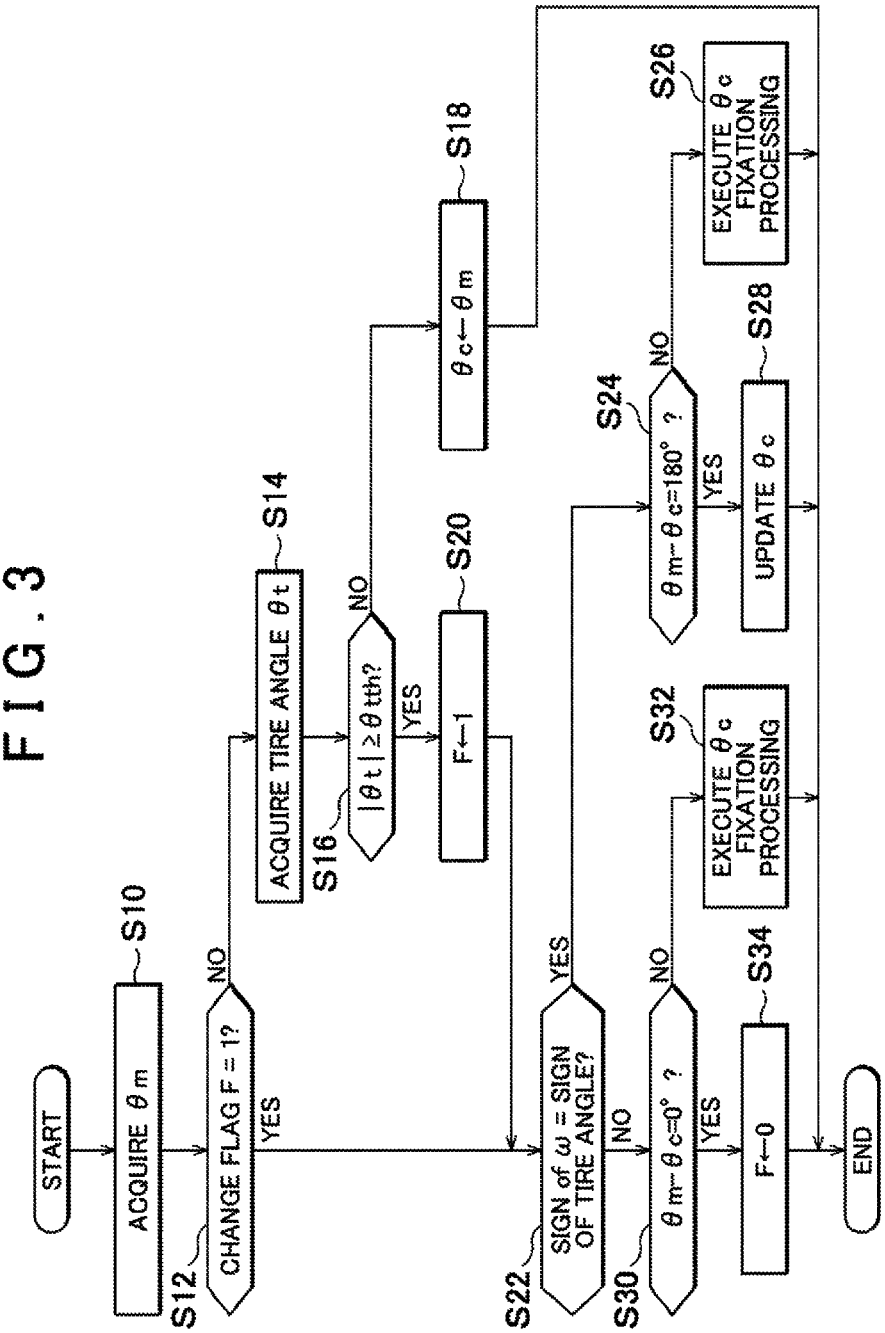
FIG. 3 is a flow diagram illustrating a procedure for angle manipulation processing according to the first embodiment.

FIG. 3 illustrates a procedure of angle manipulation processing executed mainly by the angle manipulation processing circuit 70. The processing is repeated at an update cycle for the rotation angle θm. In the present embodiment, the update cycle for the rotation angle θm is longer than a sampling cycle for the currents iu, iv, and iw.

In a series of processes illustrated in FIG. 3, the rotation-angle acquisition processing circuit 69 first acquires the rotation angle θm (S10). Subsequently, the angle manipulation processing circuit 70 determines whether or not a change flag F is 1 (S12). The change flag F indicates whether or not processing of changing the control angle θc with respect to the rotation angle θm to suppress an increase in the absolute value |θt| of the tire angle θt has been executed, such as processing of fixing the control angle θc without update when the rotation angle θm has been updated (fixation processing). The change flag F of 1 indicates that the changing processing has been executed, whereas the change flag F of 0 indicates that the changing processing has not been executed.

When the angle manipulation processing circuit 70 determines that the change flag F is zero (S12: NO), the tire-angle acquisition processing circuit 74 acquires the tire angle θt (S14). Subsequently, the angle manipulation processing circuit 70 determines whether or not the absolute value of the tire angle θt is equal to or larger than a prescribed value θtth (S116). This process is intended to determine whether or not an increased absolute value of the tire angle θt has reduced the distance between the end of the rack shaft 18 and the rack housing facing the end. This is in turn intended to execute the fixation processing, which is a process of limiting the torque of the motor 30, before end contact occurs, that is, before the end of the rack shaft 18 comes into contact with the rack housing facing the end. The prescribed value θtth is set to such a value that end contact does not occur even if the motor 30 further rotates by 180° or more. Specifically, in the present embodiment, the prescribed value θtth is set to such a value that end contact does not occur even if the motor 30 further rotates by 360°.

If the angle manipulation processing circuit 70 determines that the absolute value is smaller than the prescribed value θtth (S16: NO), the angle manipulation processing circuit 70 updates the control angle θc to the value of the rotation angle θm (S18). Thus, the control angle θc is changed according to the change rate of the rotation angle θm. On the other hand, if the angle manipulation processing circuit 70 determines that the absolute value is equal to or larger than the prescribed value θtth (S16: YES), the angle manipulation processing circuit 70 sets the change flag F to 1 (S20).

When the determination in step S12 is affirmative or the processing in step S20 is completed, the angle manipulation processing circuit 70 determines whether the sign of the rotation speed ω is equal to that of the tire angle θt (S22). This process is intended to determine whether or not the absolute value of the tire angle θt has decreased. If the angle manipulation processing circuit 70 determines that the sign of the rotation speed ω is equal to that of the tire angle θt (S22: YES), the angle manipulation processing circuit 70 determines whether or not a value resulting from subtraction of the control angle θc from the rotation angle θm is 180° (S24). This process is intended to determine whether or not the fixation processing for the control angle θc should be ended.

When the determination in step S24 is negative, the angle manipulation processing circuit 70 executes the processing of fixing the control angle θc (S26). Thus, the control angle θc is lagged behind the rotation angle θm. The torque of the motor 30 gradually decreases as the amount of the lag angle increases. That is, the current feedback control circuits 60 and 62 control the currents id and iq such that the current id coincides with id* and such that the currentiq coincides with iq*. The command current id* is equal to zero and the command current iq* is larger than zero. However, when the control angle θc lags behind the rotation angle θm, the currents id and iq input to the current feedback control circuits 60 and 62 lag behind currents actually flowing through the motor 30. This is equivalent to rotational correction of the command current id* and iq* to an advance-angle side. In this regard, the motor 30 is an SPMSM in thus embodiment. Thus, when the command currents id* and iq* are rotated to the advance-angle side, the command current id* decreases and the torque of the motor 30 is reduced.

When the determination in step S24 is affirmative, the angle manipulation processing circuit 70 stops the fixation processing and updates the control angle θc using an amount equal to an amount that is used to update the rotation angle θm (S28). Consequently, the amount by which the control angle θc lags behind the rotation angle θm is maintained at 180°. This is intended to maximize the torque of the motor 30 when the torque has such a sign that the torque reduces the absolute value of the tire angle θt.

Processing of continuing the fixation processing until the difference between the rotation angle θm and the control angle θc becomes 180° controls the change rate of the control angle θc to zero so as to reverse the sign of the torque of the motor 30.

If the angle manipulation processing circuit 70 determines that the sign of the rotation speed ω is different from that of the tire angle θt (S22: NO), the angle manipulation processing circuit 70 determines whether or not the rotation angle θm and the control angle θc are equal to each other (S30). This process is intended to determine whether or not the fixation processing for the control angle θc described below should be ended, which is a process executed as a result of the negative determination in step S22. If the angle manipulation processing circuit 70 determines that the rotation angle θm and the control angle θc are not equal to each other (S30: NO), the angle manipulation processing circuit 70 executes the fixation processing of fixing the control angle θc (S32). This process is intended to wait until the control angle θc becomes equal to the rotation angle θm when the control angle θc is different in value from the rotation angle θm as a result of the fixation processing in the above-described step S26. That is, the rotation angle θm periodically changes between 0° and 360° as the motor 30 rotates, and thus, the fixation of the control angle θc is expected to eventually make the control angle θc equal to the rotation angle θm as the rotation angle θm is repeatedly updated.

If the angle manipulation processing circuit 70 determines that the rotation angle θm and the control angle θc are equal to each other (S30: YES), the angle manipulation processing circuit 70 sets the change flag to zero (S34). In the processing in FIG. 3 that will be performed in the subsequent control cycle, the change rate of the control angle θc is equal to that of the rotation angle θm, and the control angle θc is equal to the rotation angle θm.

When the processing in steps S18, S26, S28, S32, and S34 is completed, the angle manipulation processing circuit 70 temporarily ends the series of processes.

Now, effects of the present embodiment will be described.

Figure 4:
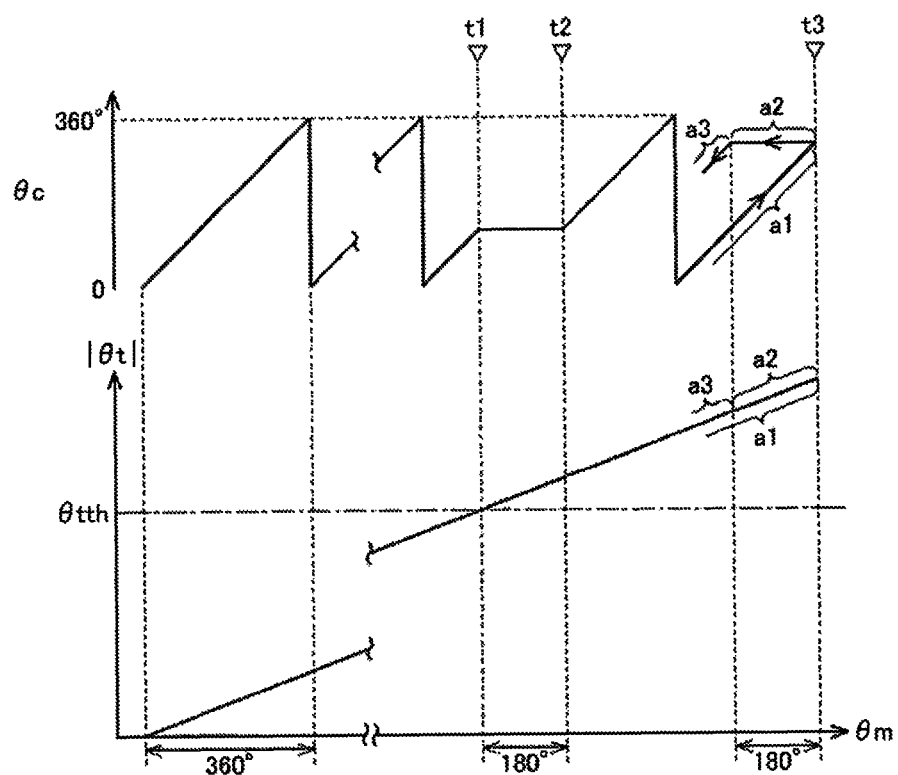
FIG. 4 is a diagram illustrating the relation between a rotation angle and a control angle according to the first embodiment.

FIG. 4 illustrates an example of transition of the control angle θc resulting from the processing in FIG. 3. In FIG. 4, the axis of abscissas represents the rotation angle θm, and values from 0° to 360° are periodically repeated on the axis of abscissas.

As illustrated in FIG. 4, before time t1 at which the absolute value |θt| of the tire angle θt is equal to or larger than the prescribed value θtth, the control angle θc is equal to the rotation angle θm of the motor and periodically changes between 0° and 360° as the rotation angle θm changes. At time t1, at which the absolute value |θt| of the tire angle θt is equal to or larger than the prescribed value θtth, the fixation processing in step S26 is executed to fix the control angle θc. Thus, the control angle θc lags behind the rotation angle θm. The current feedback control circuits 60 and 62 then perform feedback-control so that the actual currents on the d and q axes flowing through the motor 30 coincide with values obtained by advancing the command currents iq*(>0) and id*(=0). Thus, as the rotation angle θm changes, the current on the q axis, included in the currents flowing through the motor 30 and contributing to the torque, decreases, and the current on the d axis, which is a reactive current, increases. Consequently, the torque of the motor 30 gradually decreases as the rotation angle θm changes.

Figure 5:
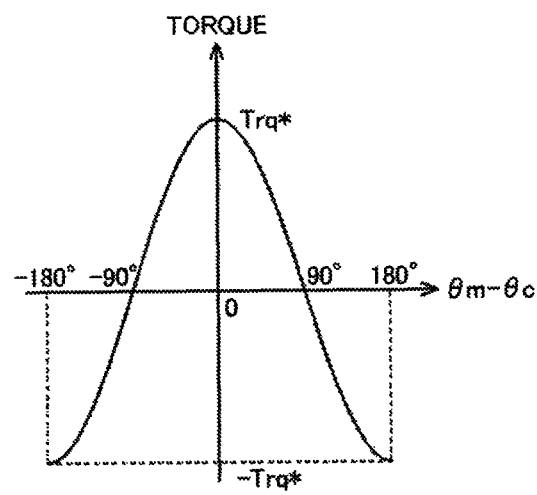
FIG. 5 is a diagram illustrating an assist torque according to the first embodiment.

If a torque of the motor 30 that assists the steering torque Trq is positive, during the fixation processing, the torque of the motor 30 gradually decreases but the absolute value of the torque gradually decreases and then gradually increases. This is because the amount by which the control angle θc lags behind the rotation angle θm exceeds 90° to reverse the sign of the torque of the motor 30. When the sign of the torque of the motor 30 is reversed, the motor 30 applies a torque that cancels the steering torque Trq to the steering system. FIG. 5 illustrates the relation between the torque of the motor 30 and the difference between the rotation angle θm and the control angle θc. As illustrated in FIG. 5, the sign of the torque of the motor 30 is reversed when the amount by which the control angle θc lags behind the rotation angle θm exceeds 90°, and the torque of the motor 30 has an absolute value equal to the target steering torque Trq* when the amount of the lag angle is 180°.

Returning to FIG. 4, at time t2 at which the amount by which the control angle θc lags behind the rotation angle θm is 180°, the fixation processing is ended. After time t2, the control angle θc is updated in the processing in the above-described step S28, according to the amount by which the rotation angle θm is updated. In other words, the control angle θc is set such that the change rate of the control angle θc is equal to that of the rotation angle θm. Thus, the motor 30 continuously applies the torque that cancels the steering torque Trq to the steering system.

Subsequently, at time t3 at which a direction in which the rotation angle θm changes is reversed, the processing in the above-described step S32 allows the fixation processing for the control angle θc to be started (period a2 in FIG. 4). After the fixation processing is started, the control angle θc is changed according to the rotation angle θm (period a3 in FIG. 4) because a 180° change in rotation angle θm makes the control angle θc equal to the rotation angle θm.

Figure 6:
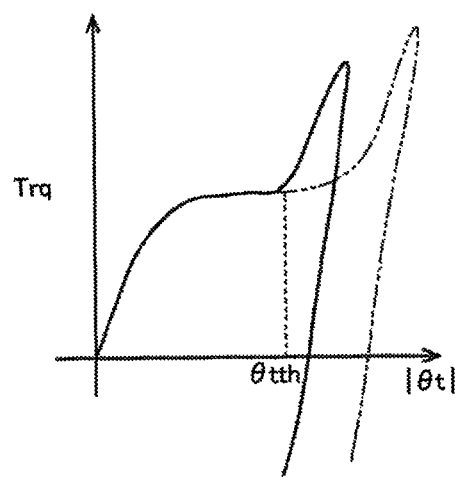
FIG. 6 is a diagram illustrating effects of the first embodiment.

FIG. 6 illustrates the relation between the transition of the absolute value |θt| of the tire angle θt and the steering torque Trq. In an example illustrated in FIG. 6, the user increases the steering torque Trq if the user attempts to increase the absolute value |θt| of the tire angle θt as the torque of the motor 30 decreases because the absolute value |θt| of the tire angle θt reaches the prescribed value θtth. However, in this case, the torque of the motor 30 immediately shifts so that the torque reduces the absolute value |θt| of the tire angle θt. Thus, the user needs to further increase the steering torque Trq in order so as to increase the absolute value |θt| of the tire angle θt. The user feels a resistive force against the action of increasing the absolute value |θt| of the tire angle θt and is thus urged to turn the steering wheel 12 in the opposite direction before the end contact occurs. In spite of this control, the end contact may occur, but even in such a case, impact which is made when the end of the rack shaft 18 comes into contact with the rack housing is sufficiently suppressed.

In contrast, a case where the processing in FIG. 3 is not executed is illustrated by a dashed line in FIG. 6. In this case, the end contact may occur, and when it occurs, the steering torque Trq may become excessively high. The above-described present embodiment produces the effects described below.

(1) When the absolute value of the tire angle θt increases, the control angle θc is fixed. This suppresses a force that is applied to the steering system and that acts to increase the absolute value of the tire angle θt.

Furthermore, since the manipulation of fixing the control angle θc is easier than the manipulation of the command currents id* and iq*, the processing for suppressing the force applied to the steering system can be simplified.

(2) The prescribed value θtth is set to the absolute value of the tire angle θt obtained before the end contact occurs. Thus, before the end contact occurs, the torque of the motor 30 acting to increase the absolute value of the tire angle θt can be reduced.

(3) The fixation processing (S26), which is started when the absolute value of the tire angle θt reaches the prescribed value θtth, is continued until the amount by which the control angle θc lags behind the rotation angle θm reaches 180°. Subsequently, the control angle θc is updated using the change rate of the rotation angle θm (S28). Thus, the torque of the motor 30 can be controlled so as to have an absolute value equal to the target steering torque Trq* and a sign reverse to the sign of the steering torque.

(4) After the absolute value of the tire angle θt reaches the prescribed value θtth, the sign of the rotation speed ω of the motor 30 is reversed and the control angle θc is then fixed again (S32). When the rotation angle θm and the control angle θc are equal to each other, the control angle θc is updated using the change rate of the rotation angle θm (S34). Thus, the control angle θc can be returned to the rotation angle θm.

Figure 7:
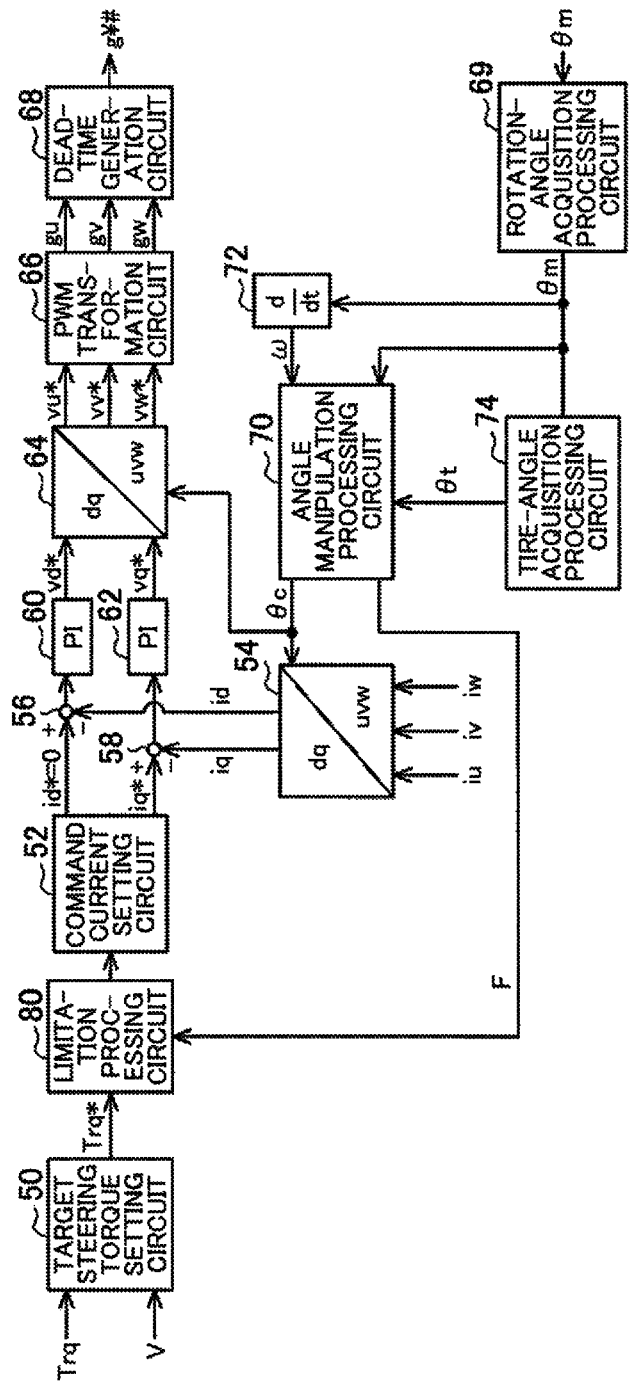
FIG. 7 is a block diagram relating to assist control according to a second embodiment.

FIG. 7 depicts a control block diagram of the ECU 40 according to a second embodiment. In FIG. 7, circuits corresponding to those in FIG. 2 are denoted by the same reference numerals for convenience.

As depicted in FIG. 7, in the second embodiment, the target steering torque Trq* set by the target steering torque setting circuit 50 is input to a limitation processing circuit 80. The limitation processing circuit 80 corrects the target steering torque Trq* and outputs the corrected target steering torque Trq* to the command current setting circuit 52. Thus, the command current setting circuit 52 sets the command current iq* based on the corrected value of the target steering torque Trq*. Thus, the command current iq* is limited to a limit current value.

The limitation processing circuit 80 limits the target steering torque Trq* to a limit torque Tg over a period of time when the change flag is kept at 1 by the angle manipulation processing circuit 70. The limit torque Tg is set to an estimated maximum value of the steering torque Trq input to the steering wheel 12 by the user.

Figure 8:
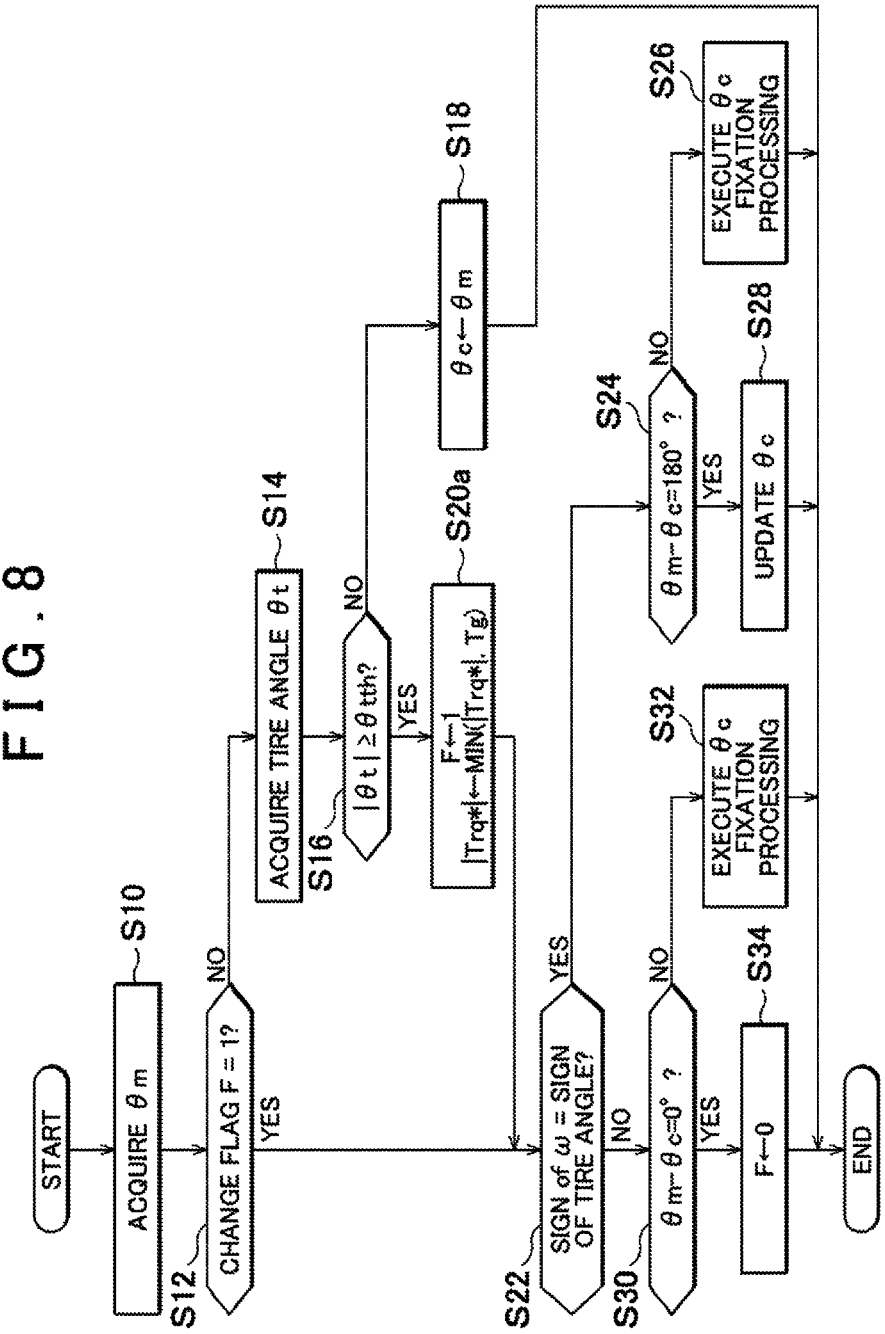
FIG. 8 is a flow diagram illustrating a procedure for angle manipulation processing and limitation processing according to the second embodiment.

FIG. 8 illustrates a procedure for angle manipulation processing and limitation processing mainly executed by the limitation processing circuit 80 and the angle manipulation processing circuit 70. In FIG. 8, processes corresponding to those in FIG. 3 are denoted by the same step numbers for convenience.

In a series of processes illustrated in FIG. 8, if the angle manipulation processing circuit 70 determines that the absolute value |θt| of the tire angle θt is equal to or larger than the prescribed value θtth (S16: YES), the angle manipulation processing circuit 70 sets the change flag F to 1. The limitation processing circuit 80 executes guard processing on the target steering torque Trq* by use of the limit torque Tg (S20*a*).

Figure 9:
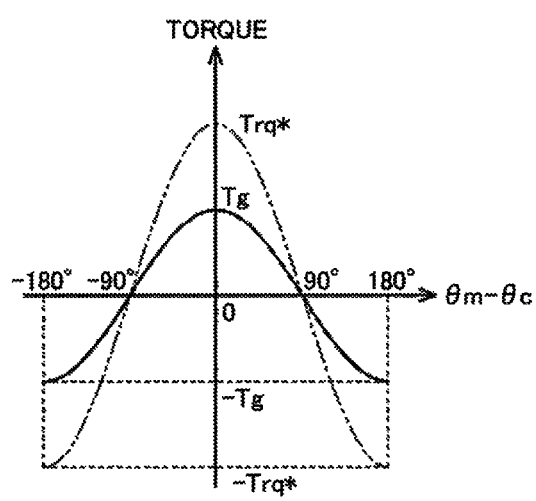
FIG. 9 is a diagram illustrating an assist torque according to the second embodiment.

Thus, as depicted by a solid line in FIG. 9, the maximum value of the absolute value of the torque of the motor 30 is limited to the limit torque Tg. Accordingly, the torque of the motor 30 obtained when the amount by which the control angle θc lags behind the rotation angle θm is 180° is −Tg. In this regard, the limit torque Tg is the estimated maximum value of the steering torque Trq as described above. Thus, the user cannot turn the steering wheel 12 in such a direction that the absolute value of the tire angle θt increases.

This configuration limits the command current iq* set by the command current setting circuit 52 as compared to a configuration in which the guard processing is not executed on the target steering torque Trq*. Thus, the absolute values of the currents flowing through the motor 30 are limited. This suppresses heat generation by the motor 30, the inverter INV, and the like.

Figure 10:
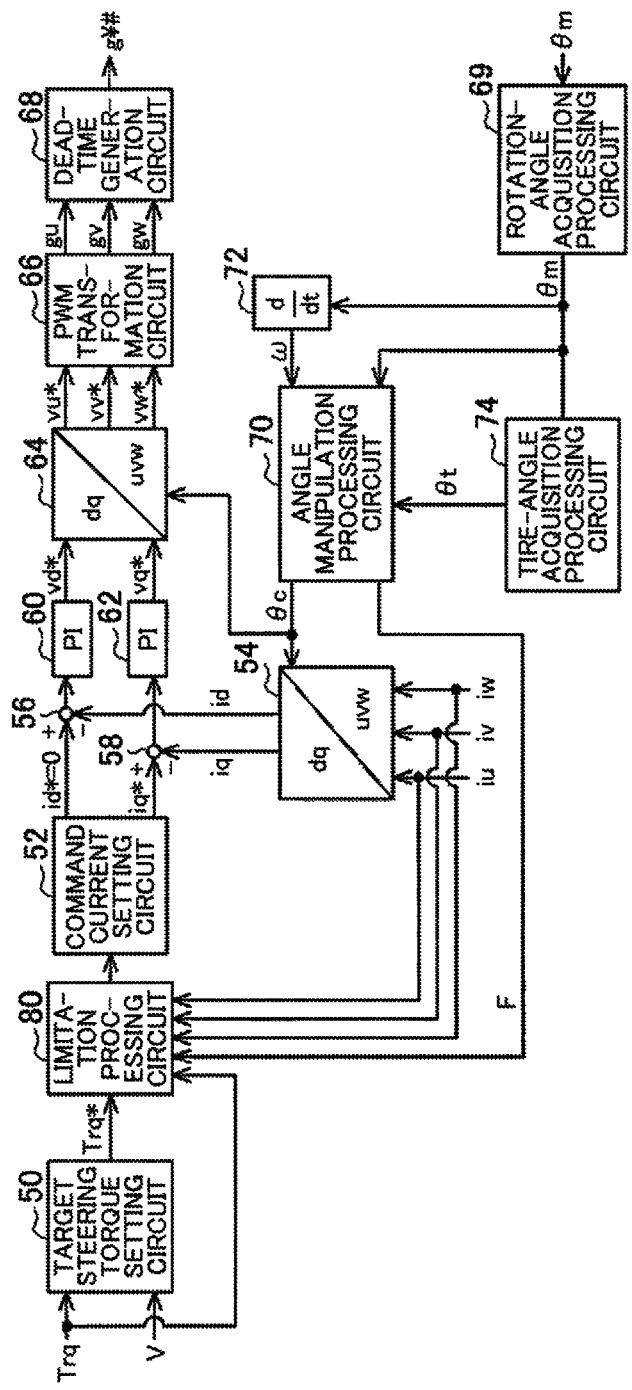
FIG. 10 is a diagram relating to assist control according to a third embodiment.

FIG. 10 depicts a control block diagram of the ECU 40 according to a third embodiment. In FIG. 10, circuits corresponding to those in FIG. 7 are denoted by the same reference numerals for convenience.

In the third embodiment, the limitation processing circuit 80 variably sets the limit torque Tg according to the currents iu, iv, and iw flowing through the motor 30 and the steering torque Trq. In this regard, the limit torque Tg is variable according to the steering torque Trq because a torque needed to suitably suppress an increase in the absolute value of the tire angle θt is set according to the steering torque Trq. In this case, the limit torque Tg may be set equal to the steering torque Trq multiplied by a predetermined number (>0). Furthermore, the currents iu, iv, and iw are parameters correlated with the temperature of the motor 30 or inverter INV. However, in the third embodiment, the motor 30 and the inverter INV, in combination with the ECU 40, are packaged into the single motor unit MCU, and thus, the currents iu, iv, and iw also serve as parameters correlated with the temperature of the ECU 40. In the third embodiment, the temperatures of the motor 30, the inverter INV, and the ECU 40 increase as amplitude values of the currents iu, iv, and iw increase, and the limit torque Tg is set to a small value. In this case, the predetermined multiplier is desirably one or larger, but may be smaller than one if the temperatures are estimated to be excessively high.

The above embodiments may be modified as follows for implementation. The tire-angle acquisition processing circuit is not limited to the calculation of the tire angle θt based on the integral value of the rotation angle θm of the motor. For example, a sensor that detects a steering angle may be provided so that the tire angle θt is calculated based on the integral value of detected values from the sensor. Furthermore, it is not essential to calculate the tire angle by multiplying the integral value of the rotation angle θm or the integral value of the steering angle by the predetermined coefficient. For example, the integral value itself may be utilized as an equivalent value of the tire angle θt. In this case, when the steering control apparatus is equipped with a gear ratio varying apparatus that can vary a gear ratio that sets the amount of change in tire angle with respect to the amount of change in steering angle, a prescribed value to be compared with the equivalent value of the tire angle θt is variably set, so that whether the absolute value of the tire angle θt is equal to or larger than the prescribed value can be determined regardless of the gear ratio.

The equivalent value of the tire angle is not limited to the integral value of the rotation angle θm or the steering angle. The equivalent value may be, for example, a detected value from a sensor that detects the distance between the end of the rack shaft 18 and the rack housing. In this case, the tire-angle acquisition processing circuit only acquires the detected value and executes no calculation processing.

In the above-described embodiments, the resolver 32 outputs the detected value of the electrical angle, and the rotation-angle acquisition processing circuit (69) acquires the detected value in step S10. However, the present invention is not limited to this. For example, the resolver 32 may output the detected value of a mechanical radian, and the ECU 40 may calculate an electrical angle from the mechanical radian.

The transformation circuits (54 and 64) may be modified as follows. For example, if no current feedback control is performed and the command voltages vd* and vq* are set as manipulative values that allow open-loop control to be performed on the command currents id* and iq*, the uvw transformation circuit 64 may be provided which serves as a fixed-transformation processing circuit that transforms the command voltages vd* and vq* into values in a fixed coordinate system, and the dq transformation circuit 54 that serves as a rotating-transformation processing circuit may be omitted.

When the command voltages vd* and vq* output by the current feedback control circuits 60 and 62 are corrected using an open-loop manipulative value such as a well-known noninterference item or induced-voltage compensation item, the uvw transformation circuit 64 that serves as a fixed-transformation processing circuit may transform the corrected values.

The steering control apparatus including both the dq transformation circuit 54 that serves as a rotating-transformation processing circuit and the uvw transformation circuit 64 that serves as a fixed-transformation processing circuit is not limited to the steering control apparatuses that perform the current feedback control in the above forms.

For example, model predictive control may be performed by predicting, given each of switching modes for the inverter INV, currents that will flow through the motor 30 based on the currents id and iq output by the dq transformation circuit 54 so that an actual switching mode is determined based on the result of the prediction. In this regard, the rotation angle (control angle) is used to predict the currents. The rotation angle may be obtained by advancing the rotation angle θm for prediction, and changing the change rate of the rotation angle produces effects according to the above-described embodiments.

For the angle manipulation processing circuit, the control angle θc has a fixed value until the control angle θc lags behind the rotation angle θm by 180° in the above-described embodiments. However, the present invention is not limited to this. For example, the control angle θc may have a fixed value until the lag angle amount reaches A° (90<A<270), and may subsequently be updated by an amount equal to the amount by which the rotation angle θm is updated.

Instead of fixing the control angle θc until the difference between the control angle θc and the rotation angle θm reaches 180°, updating the control angle θc by an amount that is double an update amount corresponding to the change rate of the rotation angle θm. In this case, the d axis component of the currents flowing through the motor 30 is controlled so as to be positive until the difference reaches 180°.

In the above-described embodiments, when the sign of the rotation speed ω the motor 30 is reversed, the control angle θc is fixed until the control angle θc becomes equal to the rotation speed θm. However, the present invention is not limited to this. For example, when the sign of the rotation speed ω of the motor 30 is reversed, the control angle θc may be immediately made equal to the rotation speed θm.

In the third embodiment (FIG. 10), the limitation processing circuit estimates the temperature of the motor 30, the inverter INV, or the manipulation circuit (ECU 40) based on the currents flowing through the motor 30. However, the present invention is not limited to this. For example, detected values from a temperature sensor may be used.

In the above-described embodiments, the absolute value of the target steering torque Trq* is directly controlled. However, the present invention is not limited to this. For example, the absolute value of the command value for the current flowing through the motor 30, such as the absolute value of the command current iq* on the q axis, may be directly controlled.

The prescribed value θtth is set to a value smaller than the maximum absolute value of the tire angle θt by a predetermined value, and the predetermined value is 360° or larger. However, the present invention is not limited to this. For example, the prescribed value θtth may be the maximum value. In this case as well, given mechanical backlash (play) of the steering system, the motor 30 may rotate slightly even after the prescribed value θtth is reached. In this case, effects according to the above-described embodiments can be produced.

For the command current setting circuit, the command current id* on the d axis is zero in the above-described embodiments. However, the present invention is not limited to this. For example, when the rotation speed ω has a large absolute value, the absolute value of the command current id* on the d axis may be set to a value larger than zero so that field weakening control is performed. In this case, the control angle θc is manipulated to change the angle between the q axis and a command current vector (id*, iq*) such that no torque is generated by the motor 30 when the angle is 90°. When the angle is between 90° and 270°, the sign of the torque of the motor 30 is opposite to that of the steering torque Trq.

The synchronous motor is not limited to the SPMSM but may be, for example, an IPMSM. Moreover, the synchronous motor may be a wound-field synchronous motor.

The electric power conversion circuit is not limited to the inverter INV according to the above-described embodiments but may be a three-level inverter. The electric power conversion circuit does not necessarily include the switching element SY# that allows for electrical connection and disconnection between each of a positive and a negative electrode of a DC voltage source (battery 39) and terminals of an electric rotating machine. For example, each of the terminals of the electric rotating machine may connect to a circuit having a circuit configuration similar to that of a well-known DCDC converter. In this case as well, output voltages from the converters are changed at a high speed so as to be set to a command voltage v¥*, which allows producing effects according to the above-described embodiments.

The motor unit is not limited to the single motor unit into which the motor 30, the inverter INV, and the ECU 40 are packaged. For example, the motor 30 and the inverter INV may be packaged into a unit, and another housing may be provided for the ECU 40. Alternatively, for example, the inverter INV and the ECU 40 may be packaged into a unit, and the motor 30 may be provided separately from the unit.

What is claimed is:

1. A steering control apparatus comprising:
an assist processing circuit that manipulates an electric power conversion circuit connected to a synchronous motor in order to generate a steering assist force using a torque of the synchronous motor;
a tire-angle acquisition processing circuit that acquires one of a tire angle of a vehicle and an equivalent value of the tire angle;
a rotation-angle acquisition processing circuit that acquires a rotation angle of the synchronous motor;
a transformation processing circuit that executes a coordinate transformation on an intermediate variable obtained during calculation of a manipulation signal output to the electric power conversion circuit by the assist processing circuit, according to a control angle determined based on the rotation angle of the synchronous motor; and
an angle manipulation processing circuit that sets a change rate of the control angle same as a change rate of the rotation angle acquired by the rotation-angle acquisition processing circuit when one of an absolute value of the tire angle and an absolute value of the equivalent value thereof is smaller than a prescribed value, and that changes the change rate of the control angle from the change rate of the rotation angle acquired by the rotation-angle acquisition processing circuit when the one of the absolute value of the tire angle and the absolute value of the equivalent value thereof is equal to or larger than the prescribed value.

2. The steering control apparatus according to claim 1, wherein,
the prescribed value is set to one of the tire angle and the equivalent value thereof, the tire angle being a tire angle the absolute value of which is smaller than a maximum value of the tire angle by a predetermined value.

3. The steering control apparatus according to claim 2, wherein,
the angle manipulation processing circuit controls the change rate of the control angle such that the torque of the synchronous motor has such a sign that reduces one of the absolute value of the tire angle and the absolute value of the equivalent value thereof when one of the absolute value of the tire angle and the absolute value of the equivalent value thereof further increases after start of processing of changing the change rate of the control angle.

4. The steering control apparatus according to claim 2, further comprising:
a current feedback control circuit that calculates a feedback manipulative value in a rotating coordinate system that is used to coincide a value, in the rotating coordinate system, of a current flowing through the synchronous motor with a command value, wherein the transformation processing circuit includes: a rotating-transformation processing circuit that uses a detected value of the current flowing through the synchronous motor as an input to transform the detected value into a value in the rotating coordinate system; and a fixed-transformation processing circuit that transforms, into a value in a fixed coordinate system, a command voltage that is a command value for a voltage applied to the synchronous motor by the electric power conversion circuit and that is the command value set according to the feedback manipulative value.

5. The steering control apparatus according to claim 1, wherein, the angle manipulation processing circuit controls the change rate of the control angle such that the torque of the synchronous motor has such a sign that reduces one of the absolute value of the tire angle and the absolute value of the equivalent value thereof when one of the absolute value of the tire angle and the absolute value of the equivalent value thereof further increases after start of processing of changing the change rate of the control angle.

6. The steering control apparatus according to claim 5, wherein, the angle manipulation processing circuit fixes the control angle until the control angle lags, by a predetermined lag angle amount, behind the rotation angle acquired by the rotation-angle acquisition processing circuit, afterwards, by causing the control angle to be lagged behind by the predetermined lag angle amount, the control angle is updated according to the change rate of the rotation angle acquired by the rotation-angle acquisition processing circuit, when the one of the absolute value of the tire angle and the absolute value of the equivalent value thereof is equal to or larger than the prescribed value, and the predetermined lag angle amount is a lag angle amount at which the control angle falls into an angle area where the synchronous motor generates a torque having the sign that is opposite to the sign of a torque obtained when the absolute value of the tire angle and the absolute value of the equivalent value thereof is equal to or larger than the prescribed value.

7. The steering control apparatus according to claim 6, wherein, in a case where rotation of the synchronous motor is reversed after the start of the processing of changing the change rate of the control angle, the angle manipulation processing circuit fixes the control angle until the control angle becomes equal to the rotation angle acquired by the rotation-angle acquisition processing circuit, afterwards updates the control angle according to the change rate of the acquired rotation angle by causing the control angle equal to the rotation angle.

8. The steering control apparatus according to claim 7, further comprising:

a current feedback control circuit that calculates a feedback manipulative value in a rotating coordinate system that is used to coincide a value, in the rotating coordinate system, of a current flowing through the synchronous motor with a command value, wherein the transformation processing circuit includes: a rotating-transformation processing circuit that uses a detected value of the current flowing through the synchronous motor as an input to transform the detected value into a value in the rotating coordinate system; and a fixed-transformation processing circuit that transforms, into a value in a fixed coordinate system, a command voltage that is a command value for a voltage applied to the synchronous motor by the electric power conversion circuit and that is the command value set according to the feedback manipulative value.

9. The steering control apparatus according to claim 5, further comprising:

a current feedback control circuit that calculates a feedback manipulative value in a rotating coordinate system that is used to coincide a value, in the rotating coordinate system, of a current flowing through the synchronous motor with a command value, wherein the transformation processing circuit includes: a rotating-transformation processing circuit that uses a detected value of the current flowing through the synchronous motor as an input to transform the detected value into a value in the rotating coordinate system; and a fixed-transformation processing circuit that transforms, into a value in a fixed coordinate system, a command voltage that is a command value for a voltage applied to the synchronous motor by the electric power conversion circuit and that is the command value set according to the feedback manipulative value.

10. The steering control apparatus according to claim 6, further comprising:

a current feedback control circuit that calculates a feedback manipulative value in a rotating coordinate system that is used to coincide a value, in the rotating coordinate system, of a current flowing through the synchronous motor with a command value, wherein the transformation processing circuit includes: a rotating-transformation processing circuit that uses a detected value of the current flowing through the synchronous motor as an input to transform the detected value into a value in the rotating coordinate system; and a fixed-transformation processing circuit that transforms, into a value in a fixed coordinate system, a command voltage that is a command value for a voltage applied to the synchronous motor by the electric power conversion circuit and that is the command value set according to the feedback manipulative value.

11. The steering control apparatus according to claim 1, further comprising:

a current feedback control circuit that calculates a feedback manipulative value in a rotating coordinate system that is used to coincide a value, in the rotating coordinate system, of a current flowing through the synchronous motor with a command value, wherein the transformation processing circuit includes: a rotating-transformation processing circuit that uses a detected value of the current flowing through the synchronous motor as an input to transform the detected value into a value in the rotating coordinate system; and a fixed-transformation processing circuit that transforms, into a value in a fixed coordinate system, a command voltage that is a command value for a voltage applied to the synchronous motor by the electric power conversion circuit and that is the command value set according to the feedback manipulative value.

12. The steering control apparatus according to claim 1, further comprising:

a limitation processing circuit that limits a current value of the synchronous motor equal to or smaller than a limit current value when the one of the absolute value of the tire angle and the absolute value of the equivalent value thereof is equal to or larger than the prescribed value.

13. The steering control apparatus according to claim 12, wherein, the limit current value is a fixed value.

14. The steering control apparatus according to claim 12, wherein, the limitation processing circuit variably sets the limit current value according to a detected value of a steering torque.

15. The steering control apparatus according to claim 12, wherein, the limitation processing circuit variably sets the limit current value, and takes into account at least one of temperatures of the synchronous motor, the electric power conversion circuit, and a manipulation circuit for the electric power conversion circuit in variably setting of the limit current value.

* * * * *